US012717664B2

(12) United States Patent
Zhu

(10) Patent No.: US 12,717,664 B2
(45) Date of Patent: Aug. 25, 2026

(54) DATA TRANSMISSION METHOD AND SYSTEM

(71) Applicant: Huawei Technologies Co., Ltd., Shenzhen (CN)

(72) Inventor: Jia Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 602 days.

(21) Appl. No.: 18/175,081

(22) Filed: Feb. 27, 2023

(65) Prior Publication Data

US 2023/0222018 A1 Jul. 13, 2023

Related U.S. Application Data

(63) Continuation of application No. PCT/CN2021/095615, filed on May 24, 2021.

(30) Foreign Application Priority Data

Aug. 28, 2020 (CN) ......................... 202010884189.0
Dec. 3, 2020 (CN) ......................... 202011394704.3

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS

| | | | | |
|---|---|---|---|---|
| 6,766,517 | B1 * | 7/2004 | Bernardo | G06F 9/546 718/102 |
| 6,782,537 | B1 * | 8/2004 | Blackmore | G06F 9/524 718/107 |
| 9,274,861 | B1 * | 3/2016 | Karppanen | G06F 9/546 |
| 2010/0332755 | A1 * | 12/2010 | Bu | G06F 9/52 711/119 |
| 2013/0290984 | A1 * | 10/2013 | Denio | G06F 9/546 719/314 |
| 2018/0191630 | A1 * | 7/2018 | Kenny | G06F 13/00 |
| 2019/0012269 | A1 * | 1/2019 | Bubb | G06F 3/0629 |
| 2019/0087225 | A1 | 3/2019 | Rozen et al. | |
| 2020/0004703 | A1 | 1/2020 | Sankaran et al. | |
| 2020/0012610 | A1 * | 1/2020 | Shalev | G06F 13/1673 |
| 2020/0028792 | A1 * | 1/2020 | Holla | H04L 47/6255 |

FOREIGN PATENT DOCUMENTS

| | | |
|---|---|---|
| CN | 106095604 A | 11/2016 |

* cited by examiner

*Primary Examiner* — Charles E Anya
(74) *Attorney, Agent, or Firm* — Conley Rose, P.C.

(57) ABSTRACT

In a data transmission method, a plurality of communications submodules communicate in a parallel manner. A second communications submodule in the plurality of communications submodules sends, to a hardware queue, data for a first communications submodule. The first communications submodule obtains the data from the hardware queue when a state of writing data into the hardware queue is triggered. The hardware queue may be in a first processor for running the first communications submodule or in a second processor for running the second communications submodule.

18 Claims, 6 Drawing Sheets

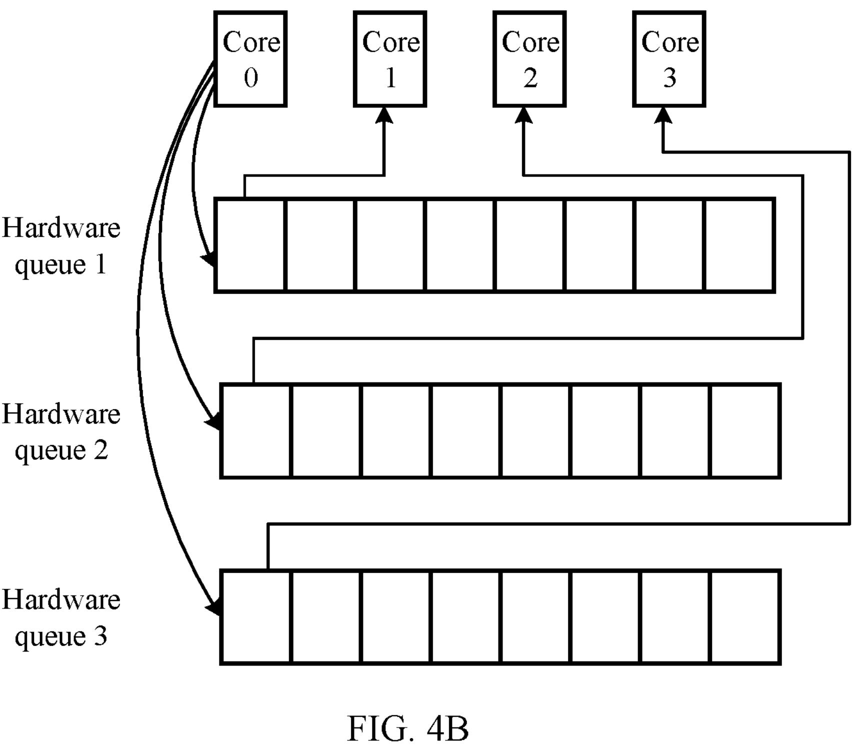

A second communications submodule sends, to a hardware queue, data that needs to be sent to a first communications submodule, where the hardware queue is a hardware queue in a first processor for running the first communications submodule or a hardware queue in a second processor for running the second communications submodule

502

The first communications submodule obtains the data from the hardware queue when a state of writing data into the hardware queue is triggered, where the second communications submodule is one of a plurality of second communications submodules, and the plurality of second communications submodules communicate with the first communications submodule in a parallel manner; or the first communications submodule is one of a plurality of first communications submodules, and the plurality of first communications submodules communicate with the second communications submodule in a parallel manner

FIG. 5

DATA TRANSMISSION METHOD AND SYSTEM

CROSS-REFERENCE TO RELATED APPLICATIONS

The present disclosure is a continuation of International Patent Application No. PCT/CN2021/095615, filed on May 24, 2021, which claims priority to Chinese Patent Application No. 202011394704.3, filed on Dec. 3, 2020, and Chinese Patent Application No. 202010884189.0, filed on Aug. 28, 2020, all of which are hereby incorporated by reference in their entireties.

TECHNICAL FIELD

The present disclosure relates to the field of information technologies, and in particular, to a data transmission method and system.

BACKGROUND

A message passing interface (MPI) standard is a cross-language communications protocol that supports point-to-point and collective communication. An MPI aims at high performance, a large scale, and portability, and is a current main communication model for high-performance computing. Generally, the MPI communication has a relatively high proportion in a typical high-performance computing (HPC) scenario. For example, in Allreduce collective communication, data of each process is first aggregated and reduced, and then broadcast to each process. Finally, each process obtains the same piece of reduced data.

In collective communication, when a plurality of processes communicate with one process, or one process communicates with a plurality of processes, communication efficiency is low.

SUMMARY

The present disclosure provides a data transmission method and system to improve data transmission efficiency.

According to a first aspect, the present disclosure provides a data transmission method. The method includes the following:

A second communications submodule sends, to a hardware queue, data that needs to be sent to a first communications submodule. The hardware queue is a hardware queue in a first processor for running the first communications submodule or a hardware queue in a second processor for running the second communications submodule.

The first communications submodule obtains the data from the hardware queue when a state of writing data into the hardware queue is triggered. The second communications submodule is one of a plurality of second communications submodules. The plurality of second communications submodules communicate with the first communications submodule in a parallel manner. Alternatively, the first communications submodule is one of a plurality of first communications submodules. The plurality of first communications submodules communicate with the second communications submodule in a parallel manner.

In the foregoing method, the second submodule sends the data to the first submodule by using the hardware queue. In this way, the second submodule does not need to send a notification message to the first submodule to notify the first submodule that data has been sent, to reduce a delay of communication between the second submodule and the first submodule, thereby improving communication efficiency. In addition, because the data is received by using a form of the hardware queue, the first communications submodule only needs to determine whether a state of the hardware queue reaches a preset state, and does not need to determine in a counting manner whether the data sent by the second communications submodule is received, to reduce resource occupation caused due to the counting. In this way, performance of communication between the second submodule and the first submodule can be improved without changing communication correctness.

In an embodiment, the plurality of second communications submodules are a plurality of different second communications submodules. The plurality of different second communications submodules communicate with the first communications submodule in the parallel manner. In an implementation, the plurality of different second communications submodules communicate with the first communications submodule in the parallel manner. In an implementation, the plurality of different second communications submodules are a plurality of different submodules in collective communication. The first communications submodule is a root module in collective communication.

In an embodiment, the plurality of first communications submodules are a plurality of different first communications submodules. The plurality of first communications submodules communicate with the second communications submodule in the parallel manner. In an implementation, the plurality of different first communications submodules receive, in the parallel manner, the data sent by the second communications submodule. In an implementation, the plurality of different first communications submodules are a plurality of different submodules in collective communication. The second communications submodule is a root module in collective communication.

Optionally, the second communications submodule is one of the plurality of different second communications submodules, and the first communications submodule is also one of the plurality of different first communications submodules. The plurality of different second communications submodules communicate with the plurality of different first communications submodules in the parallel manner. In an implementation, the plurality of different first communications submodules receive, in the parallel manner, data sent by the plurality of different second communications submodules; or the plurality of different first communications submodules send data to the plurality of different second communications submodules in the parallel manner.

Optionally, the hardware queue is a hardware message queue, a lock-free hardware queue, or a lock-free hardware message queue.

Optionally, the lock-free hardware queue or the lock-free hardware message queue indicates that order preservation of the hardware queue does not need to be implemented in a software locking manner.

In some possible implementations, the first communications submodule is run by using the first processor or a subunit in the first processor, and the second communications submodule is run by using the second processor or a subunit in the second processor.

Optionally, that the first communications submodule is run by using the first processor indicates that the first communications submodule is run by using the first processor or the first processor runs a program or an instruction of the first communications submodule, to implement functions of the first communications submodule, for example, implement a function of obtaining the data from the hardware queue by the first communications submodule when the state of writing data into the hardware queue is triggered. It may be understood that, that the first communications submodule is run by using the subunit in the first processor and that the second communications submodule is run by using the second processor or the subunit in the second processor are similar to an implementation in which the first communications submodule is run by using the first processor.

Optionally, the hardware queue is a hardware queue of a subunit for running the first communications submodule in the first processor. Alternatively, the hardware queue may be a hardware queue of a subunit for running the second communications submodule in the second processor. Alternatively, the hardware queue may be an independent hardware queue in the first processor or the second processor.

In some possible implementations, the first processor is any one of a central processing unit (CPU), a die in the CPU, a graphics processing unit (GPU), or a die in the GPU, and the second processor is any one of a CPU, a die in the CPU, a GPU, or a die in the GPU. The subunit is a core. One die includes one or more cores.

Optionally, the first processor or the second processor may alternatively be another processor similar to a CPU or a GPU. For example, the first processor may alternatively be a processor or a chip having a computing capability, for example, a general-purpose graphics processing unit (GPGPU), a tensor processing unit (TPU), or a data processing unit (DPU).

In some possible implementations, the first processor reads an instruction of the first communications submodule from a memory by using a bus and executes the instruction to run the first communications submodule, and the second processor reads an instruction of the second communications submodule from the memory by using the bus and executes the instruction to run the second communications submodule.

Optionally, the memory may be a volatile memory, for example, a random-access memory (RAM), or may include a non-volatile memory, for example, a read-only memory (ROM), a flash memory, a solid-state drive (SSD), or a mechanical hard disk drive (HDD).

In some possible implementations, information that is sent by the second communications submodule to the hardware queue further includes management information related to the data.

Correspondingly, the first communications submodule further obtains the management information from the hardware queue when the state of writing data into the hardware queue is triggered.

Optionally, the management information includes but is not limited to information related to a packet header of the data or information required by a task of processing the data. For example, the management information may be information such as a data volume, an address, or a data-related task identifier.

The second communications submodule writes the management information of the data into the hardware queue, so that the first communications submodule can process, based on the management information, the data written into the hardware queue, to further improve efficiency of receiving and processing the data by the first communications submodule.

In some possible implementations, the first communications submodule and the second communications submodule are run in different processors.

Alternatively, the first communications submodule and the second communications submodule are run in different dies.

For the first communications submodule and the second communications submodule that are run in different processors, or for the first communications submodule and the second communications submodule that are run in different dies, a communication delay is relatively long if notification information needs to be sent between the first communications submodule and the second communications submodule by using an interconnect bus between processors or an interconnect bus between dies. In the foregoing method, the first communications submodule and the second communications submodule that are run in different processors transmit data by using the hardware queue, or the first communications submodule and the second communications submodule that are run in different dies transmit data by using the hardware queue. No notification message needs to be sent. Therefore, a delay caused due to transmission of a notification message can be significantly reduced.

In some possible implementations, a shared cache of the subunit for running the first communications submodule is different from a shared cache of the subunit for running the second communications submodule.

Optionally, the subunit may be a core. When the shared cache of the subunit for running the first communications submodule is different from the shared cache of the subunit for running the second communications submodule, a communication delay is relatively long if notification information needs to be sent between the first communications submodule and the second communications submodule by using an interconnect bus between dies. In the foregoing method, the first communications submodule and the second communications submodule transmit data by using the hardware queue. No notification message needs to be sent. Therefore, a delay caused due to transmission of a notification message can be significantly reduced.

In some possible implementations, that a state of writing data into the hardware queue is triggered includes: a length of the hardware queue reaches a preset condition.

In some possible implementations, that a length of the hardware queue reaches a preset condition includes: data in the hardware queue includes all data that needs to be received by the first communications submodule, or data of data in the hardware queue includes a part of data that needs to be received by the first communications submodule.

In the foregoing implementation, when the data of the data in the hardware queue includes a part of the data that needs to be received by the first communications submodule, the first communications submodule obtains the data from the hardware queue, to further improve a speed at which the first communications submodule obtains the data and reduce a delay required for obtaining the data. For example, when the first communications submodule needs to obtain three pieces of data, the first communications submodule may obtain the data from the hardware queue when the length of the hardware queue is 1. When the three pieces of data are written into the hardware queue, the first communications submodule has obtained the three pieces of data. In this way, a delay from a time at which a first piece of data is written into the hardware queue to a time at which a third piece of data is written into the hardware queue can be reduced, and efficiency of obtaining the data by the first communications submodule can be further improved.

In some possible implementations, the first communications submodule communicates with the second communications submodule by using an MPI interface.

Optionally, the first communications submodule and the second communications submodule are communications submodules in collective communication.

In some possible implementations, when the plurality of second communications submodules communicate with the first communications submodule in the parallel manner, the first communications submodule processes data that is sent by the plurality of second communications submodules and that is obtained from the hardware queue, and separately sends the processed data to the plurality of second communications submodules.

In some possible implementations, that the first communications submodule processes the data that is sent by the plurality of second communications submodules and that is obtained from the hardware queue includes: the first communications submodule performs reduction processing on the data that is sent by the plurality of second communications submodules and that is obtained from the hardware queue.

Optionally, the reduction operation includes but is not limited to: performing summation, obtaining a maximum value, or exchanging.

In some possible implementations, the first communications submodule is a process or a thread, and the second communications submodule is a process or a thread.

According to a second aspect, the present disclosure provides a data transmission system. The system includes a first processing unit and a second processing unit.

The second processing unit is configured to send, to a hardware queue, data to be sent to a first processing unit. The hardware queue is a hardware queue in a processor in which the first processing unit is located or a hardware queue in a processor in which the second processing unit is located.

The first processing unit is configured to obtain the data from the hardware queue when a state of writing data into the hardware queue is triggered. The second processing unit is one of a plurality of second processing units. The plurality of second processing units communicate with the first processing unit in a parallel manner. Alternatively, the first processing unit is one of a plurality of first processing units. The plurality of first processing units communicate with the second processing unit in a parallel manner.

In the foregoing system, the second processing unit sends the data to the first processing unit by using the hardware queue. In this way, the second processing unit does not need to send a notification message to the first processing unit to notify the first processing unit that data has been sent, to reduce a delay of communication between the second processing unit and the first processing unit, thereby improving communication efficiency. In addition, because the data is received by using a form of the hardware queue, the first processing unit only needs to determine whether a state of the hardware queue reaches a preset state, and does not need to determine in a counting manner whether the data sent by the second processing unit is received, to reduce resource occupation caused due to the counting. In this way, performance of communication between the second processing unit and the first processing unit can be improved without changing communication correctness.

Optionally, the plurality of second processing units are a plurality of different second processing units, and the plurality of first processing units are a plurality of different first processing units.

Optionally, the hardware queue is a hardware message queue, a lock-free hardware queue, or a lock-free hardware message queue.

Optionally, the lock-free hardware queue or the lock-free hardware message queue indicates that order preservation of the hardware queue does not need to be implemented in a software locking manner.

Optionally, the hardware queue is a hardware queue of the first processing unit. Alternatively, the hardware queue may be a hardware queue of the second processing unit. Alternatively, the hardware queue may be an independent hardware queue in a processor in which the first processing unit is located or in a processor in which the second processing unit is located.

In some possible implementations, the first processing unit is any one of a CPU, a die in the CPU, a GPU, a die in the GPU, or a core in the die.

The second processing unit is any one of a CPU, a die in the CPU, a GPU, a die in the GPU, or a core in the die.

Optionally, the processor in which the first processing unit is located or the processor in which the second processing unit is located may be another processor similar to a CPU or a GPU. For example, the first processing unit may alternatively be a processor or a chip having a computing capability, for example, a GPGPU, a TPU, or a DPU.

In some possible implementations, the first processing unit obtains the data from the hardware queue through running a first communications submodule.

The second processing unit sends, to the hardware queue through running a second communications submodule, the data to be sent to the first processing unit.

Optionally, the plurality of second processing units run a plurality of different second communications submodules. The plurality of different second communications submodules communicate with the first communications submodule in the parallel manner. In an implementation, the plurality of different second communications submodules communicate with the first communications submodule in the parallel manner. In an implementation, the plurality of different second communications submodules are a plurality of different submodules in collective communication. The first communications submodule is a root module in collective communication.

Optionally, the plurality of first processing units run a plurality of different first communications submodules. The plurality of different first communications submodules communicate with the second communications submodule in the parallel manner. In an implementation, the plurality of different first communications submodules receive, in the parallel manner, the data sent by the second communications submodule. In an implementation, the plurality of different first communications submodules are a plurality of different submodules in collective communication. The second communications submodule is a root module in collective communication.

Optionally, the plurality of different first processing units run the plurality of different first communications submodules. The plurality of different second processing units run the plurality of different second communications submodules. The plurality of different first processing units communicate with the plurality of different second processing units in the parallel manner. In an implementation, the plurality of different first processing units receive, in the parallel manner, data sent by the plurality of different second processing units; or the plurality of different first processing units send data to the plurality of different second processing units in the parallel manner.

In some possible implementations, the system further includes a memory and a bus.

The memory is configured to store the first communications submodule and the second communications submodule.

The first processing unit reads an instruction of the first communications submodule from the memory by using the bus and executes the instruction to run the first communications submodule.

The second processing unit reads an instruction of the second communications submodule from the memory by using the bus and executes the instruction to run the second communications submodule.

Optionally, the memory may be a volatile memory, for example, a RAM, or may include a non-volatile memory, for example, a ROM, a flash memory, an SSD, or an HDD.

In some possible implementations, the second processing unit is further configured to send, to the hardware queue, management information related to the data.

The first processing unit is further configured to further obtain the management information from the hardware queue when a state of writing data into the hardware queue is triggered.

Optionally, the management information includes but is not limited to information related to a packet header of the data or information required by a task of processing the data. For example, the management information may be information such as a data volume, an address, or a data-related task identifier.

The second processing unit writes the management information of the data into the hardware queue, so that the first processing unit can process, based on the management information, the data written into the hardware queue, to further improve efficiency of receiving and processing the data by the first processing unit.

In some possible implementations, the first processing unit and the second processing unit are different processors, or the first processing unit and the second processing unit are different dies.

For the first processing unit and the second processing unit that are run in different processors, or for the first processing unit and the second processing unit that are run in different dies, a communication delay is relatively long if notification information needs to be sent between the first processing unit and the second processing unit by using an interconnect bus between processors or an interconnect bus between dies. In the foregoing system, the first processing unit and the second processing unit that are run in different processors transmit data by using the hardware queue, or the first processing unit and the second processing unit that are run in different dies transmit data by using the hardware queue. No notification message needs to be sent. Therefore, a delay caused due to transmission of a notification message can be significantly reduced.

In some possible implementations, a shared cache of the first processing unit is different from a shared cache of the second processing unit.

When the shared cache of the first processing unit is different from the shared cache of the second processing unit, a communication delay is relatively long if notification information needs to be sent between the first processing unit and the second processing unit by using an interconnect bus between dies. In the foregoing system, the first processing unit and the second processing unit transmit data by using the hardware queue. No notification message needs to be sent. Therefore, a delay caused due to transmission of a notification message can be significantly reduced.

In some possible implementations, that a state of writing data into the hardware queue is triggered includes: a length of the hardware queue reaches a preset condition.

In some possible implementations, that a length of the hardware queue reaches a preset condition includes: data in the hardware queue includes all data that needs to be received by the first communications submodule, or data of data in the hardware queue includes a part of data that needs to be received by the first communications submodule.

In the foregoing implementation, when the data of the data in the hardware queue includes a part of the data that needs to be received by the first communications submodule, the first communications submodule obtains the data from the hardware queue, to further improve a speed at which the first communications submodule obtains the data and reduce a delay required for obtaining the data. For example, when the first communications submodule needs to obtain three pieces of data, the first communications submodule may obtain the data from the hardware queue when the length of the hardware queue is 1. When the three pieces of data are written into the hardware queue, the first communications submodule has obtained the three pieces of data. In this way, a delay from a time at which a first piece of data is written into the hardware queue to a time at which a third piece of data is written into the hardware queue can be reduced, and efficiency of obtaining the data by the first communications submodule can be further improved.

In some possible implementations, the first communications submodule communicates with the second communications submodule by using a message passing interface MPI standard interface.

Optionally, the first communications submodule and the second communications submodule are communications submodules in collective communication.

In some possible implementations, when the plurality of second processing units communicate with the first processing unit in the parallel manner, the first processing unit processes data that is sent by the plurality of second processing units and that is obtained from the hardware queue, and separately sends the processed data to the plurality of second processing units.

In some possible implementations, that the first processing unit processes data that is sent by the plurality of second processing units and that is obtained from the hardware queue includes: the first processing unit performs reduction processing on the data that is sent by the plurality of second processing units and that is obtained from the hardware queue.

Optionally, the reduction operation includes but is not limited to: performing summation, obtaining a maximum value, or exchanging.

In some possible implementations, the first communications submodule is a process or a thread, and the second communications submodule is a process or a thread.

According to a third aspect, an embodiment of the present disclosure provides a computer program product including instructions. When the computer program product is run on a computer device, the computer device is enabled to perform the method according to any implementation of the first aspect.

According to a fourth aspect, an embodiment of the present disclosure provides a computer readable storage medium. The computer readable storage medium stores instructions. The instructions instruct a computer device to perform the method according to any implementation of the first aspect.

BRIEF DESCRIPTION OF DRAWINGS

The following briefly describes the accompanying drawings for describing embodiments. It is clearly that the accompanying drawings in the following description show merely some embodiments of the present application, and a person of ordinary skill in the art may derive other drawings from these accompanying drawings without creative efforts.

FIG. 4B is a schematic diagram of implementing one-to-many communication by using a hardware queue according to an embodiment of the present disclosure;

FIG. 5 is a schematic flowchart of a collective communication method according to an embodiment of the present disclosure.

DESCRIPTION OF EMBODIMENTS

Figure 1A:
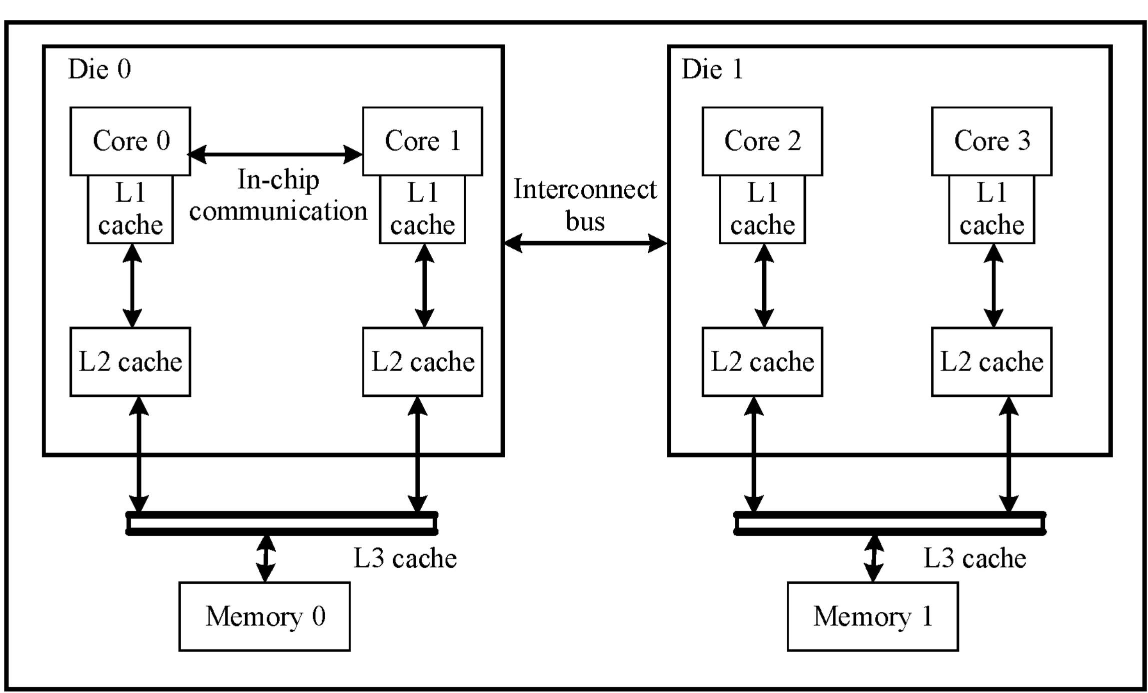
FIG. 1A is a schematic diagram of a structure of a NUMA-based multi-core system structure.

The following describes the embodiments of the present application with reference to the accompanying drawings.

In this specification, the claims, and the accompanying drawings of the present disclosure, the terms "first", "second", and so on are intended to distinguish between similar objects but do not necessarily indicate a specific order or sequence. It should be understood that the data used in such a way are interchangeable in appropriate circumstances, so that the embodiments described herein can be implemented in an order other than the content illustrated or described herein. In addition, the terms "first" and "second" are merely intended for a purpose of description, and shall not be understood as an indication or implication of relative importance or an implicit indication of a quantity of indicated technical features. Therefore, a feature limited by "first" or "second" may explicitly indicate or implicitly include one or more such features.

In this specification and the claims of the present disclosure, the terms "include", "contain" and any other variants mean to cover a non-exclusive inclusion, for example, a process, method, system, product, or device that includes a series of steps or modules is not necessarily limited to those expressly listed steps or modules, but may include other steps or modules not expressly listed or inherent to such a process, method, product, or device. Names or numbers of steps in the present disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Unit division in the present disclosure is logical division and may be other division during actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in the present disclosure. In addition, units or subunits described as separate parts may or may not be physically separate, may or may not be physical units, or may be distributed into a plurality of circuit units. Some or all of the units may be selected according to actual requirements to achieve the objectives of the solutions of the present disclosure.

It should be understood that the terms used in the descriptions of the various examples in this specification and the claims of the present disclosure are merely intended to describe specific examples, but are not intended to limit the examples. The terms "one" ("a" and "an") and "the" of singular forms used in the descriptions of various examples and the appended claims are also intended to include plural forms, unless otherwise specified in the context clearly.

It should be further understood that the term "and/or" used in this specification and the claims of the present disclosure refers to and covers any or all possible combinations of one or more associated listed items. The term "and/or" describes an association relationship between associated objects and represents that three relationships may exist. For example, A and/or B may represent the following three cases: Only A exists, both A and B exist, and only B exists. In addition, the character "/" in the present disclosure generally indicates an "or" relationship between associated objects.

It should be understood that determining B based on A does not mean that B is determined based on only A, but B may alternatively be determined based on A and/or other information.

It should be further understood that when being used in this specification, the term "include" (also referred to as "includes", "including", "comprises", and/or "comprising") specifies presence of stated features, integers, steps, operations, elements, and/or components, but does not preclude presence or addition of one or more other features, integers, steps, operations, elements, components, and/or groups thereof.

It should be further understood that the term "if" may be interpreted as a meaning "when", "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of the present disclosure. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

Preferably, some terms and related technologies in the present disclosure are explained and described, to facilitate understanding.

Allreduce collective communication is a many-to-many communication manner. Data of each process is first aggregated and reduced. Then, the reduced data is broadcast to each process. Finally, each process obtains the same piece of reduced data.

A multi-core technology is a chip multiprocessor (CMP) technology. In other words, a plurality of processor logic units (cores) are placed in the same integrated circuit chip. An advantage of the multi-core technology is that more processing units operate at the same time to improve overall performance of a processor while maintaining relatively low power consumption.

For a die, a chip manufacturing process may be divided into a front end and a back end. The front end is responsible for wafer processing, including wafer fabrication and wafer test. The back end is responsible for chip fabrication, including cutting a wafer into dies, chip package, and chip test. The wafer is a carrier of a chip circuit. One wafer can be used to manufacture a plurality of chips. A layout of an integrated circuit is first printed on a mask. After complex steps such as photolithography, doping, and corrosion, a transistor is formed on the wafer, and then copper ions are injected to form a conducting wire, to generate the integrated circuit. One wafer includes a plurality of square dies (die). Each wafer or die includes an independent integrated circuit. After being packaged, the wafer or the die becomes an independent chip. Generally, one packaged wafer may include one or more cores.

An MPI is a message passing interface standard developed for a message passing parallel programming mode. An MPI communications interface defines a point-to-point communications interface and a collective communications interface that together form the basis for MPI application communication logic. MPI communication is performed in units of communicators. The communicator logically defines a group of processes that can communicate with each other. The collective communication indicates a communication operation completed through participation of a group of processes. The collective communication may be further classified into four types according to a communication mode: one-to-many, many-to-one, many-to-many, and synchronization. The one-to-many communication mode includes broadcast and scatter. Broadcast communication indicates that the same message is sent from a root process to another processes. A scatter operation indicates that a root process sends different messages to different processes. Gather is a typical many-to-one communication mode. In this mode, all processes participating in collective communication send messages of the processes to the root process. In the many-to-many communication mode, there is an Allgather mode. The Allgather mode indicates that each process broadcasts a message of the process to other processes. Further, there is an all-to-all (Alltoall) mode. A communication meaning of the all-to-all mode is that each process sends different messages to other processes. This is equivalent to a scatter operation performed by each process. The last one is a barrier mode. The barrier mode is a global synchronization operation that releases all processes when the processes reach the same program execution point. An MPI-based application can be easily migrated to a mainstream system in the HPC field, for example, massively parallel processing (MPP), a cluster, symmetric multiprocessing (SMP), and cache coherent non-uniform memory access (cc-NUMA).

High-performance computers are at the forefront of the computer field, and mainly serve scientific research and major social production activities. With the progress of modern science and technology, people continuously try to use more accurate models to study the natural world. Therefore, a computing amount keeps increasing, and dependence on the high-performance computers becomes increasingly high.

A CPU is a core component for implementing performance of a computer system. However, development of the CPU is gradually limited by problems such as a memory wall, an instruction-level parallel wall, or a power consumption wall. It is difficult to continue to improve performance through increasing an operating frequency. At this time, the multi-core technology quickly becomes a main technical way to improve the performance of the central processing unit. In a multi-core era, performance improvement of the high-performance computers mainly depends on expansion of a parallel scale, and improvement of a running speed of an application mainly depends on improvement of a parallel degree.

The multi-core technology is rapidly applied in the HPC field, and promotes rapid development of the high-performance computers. A common multi-core processor system is a processor system with a non-uniform memory access (NUMA) structure. In the processor system with the NUMA structure, a memory directly connected to a processor is referred to as a local memory, and a memory not directly connected to the processor is referred to as a remote memory. When the processor needs to access the local memory, only a local memory controller needs to be used. Therefore, there are a relatively low delay and a relatively high transmission bandwidth when a core on the processor accesses the local memory. When the processor needs to access the remote memory, an interconnect bus (interconnect links) and a remote memory controller need to be used. Therefore, there are a relatively high delay and a relatively low transmission bandwidth when the processor accesses the remote memory.

FIG. 1A is a schematic diagram of a structure of a NUMA-based multi-core system structure. FIG. 1A includes two dies (a die 0 and a die 1). Each die includes two cores. Each core has an independent level-1 cache (L1 cache) and an independent level-2 cache (L2 cache). Two cores in each die share one level-3 cache (L3 cache). For example, a core 0 and a core 1 in the die 0 share one level-3 cache. The core in each die may independently access a memory. For example, both a core 2 and a core 3 in the die 1 can access a memory 1. The cores in the two dies (for example, the core 2 in the die 1 and the core 0 in the die 0) communicate with each other by using an interconnect bus. The core 2 and the core 3 may also access a memory 0 by using the interconnect bus.

Figure 1B:
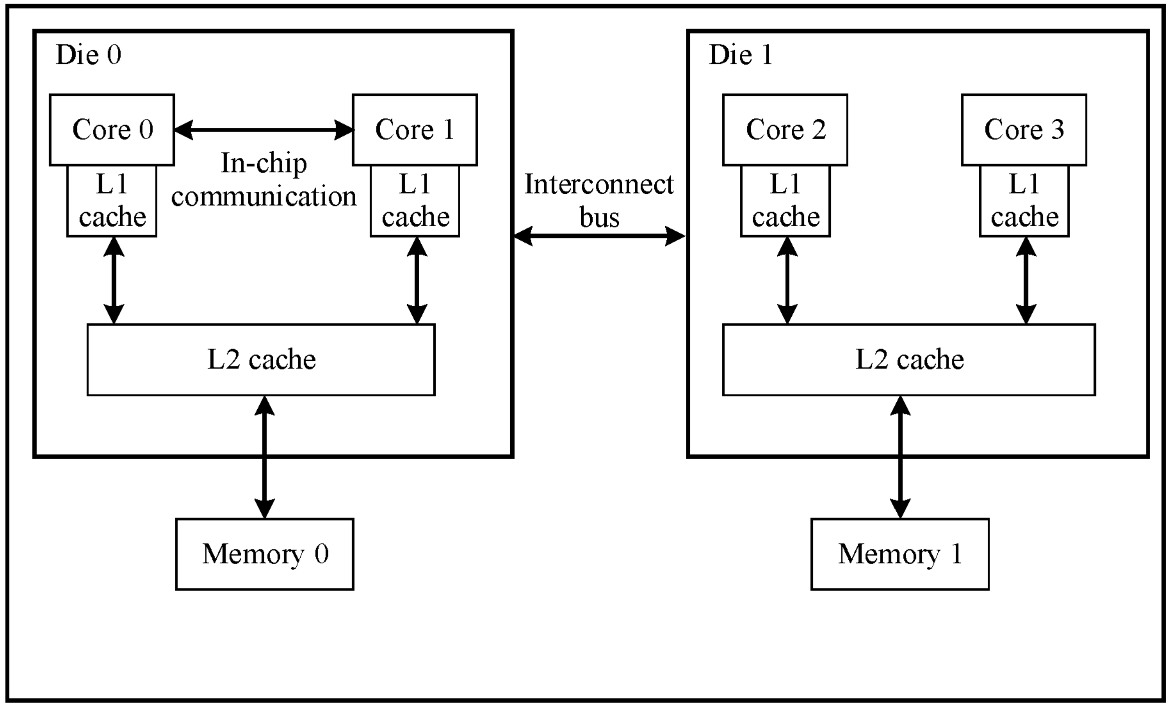
FIG. 1B is another schematic diagram of a structure of a multi-core system structure based on a NUMA structure.

FIG. 1B is another schematic diagram of a structure of a NUMA-based multi-core system structure. FIG. 1B includes two dies (a die 0 and a die 1). Each die includes two cores. Each core has an independent L1 cache. Two cores in each die share one L2 cache. For example, a core 0 and a core 1 in the die 0 share one level-2 cache. The core in each die may independently access a memory. For example, both a core 2 and a core 3 in the die 1 can access a memory 1. The cores in the two dies (for example, the core 2 in the die 1 and the core 0 in the die 0) communicate with each other by using an interconnect bus. The core 2 and the core 3 may also access a memory 0 by using the interconnect bus.

In NUMA architecture shown in FIG. 1A or FIG. 1B, when processes running on different cores communicate with each other, there is a problem of low communication efficiency. For example, a root process is run by using the core 0, a subprocess 1 is run by using the core 1, a subprocess 2 is run by using the core 2, and a subprocess 3 is run by using the core 3. When the subprocesses (the subprocess 1, the subprocess 2, and the subprocess 3) send data to the root process, an implementation process is as follows:

Step A1: Each subprocess sends, to buffer areas corresponding to mutually independent addresses in a shared memory, data that needs to be sent to the root process.

Step A2: Each subprocess separately sends a notification message to the root process, to indicate that data transmission is completed.

Step A3: The root process polls whether the notification messages of all the subprocesses are received.

Step A4: After receiving the notification messages of all the subprocesses, the root process obtains, from the corresponding buffer areas, the data sent by each subprocess and processes the data.

Figure 1C:
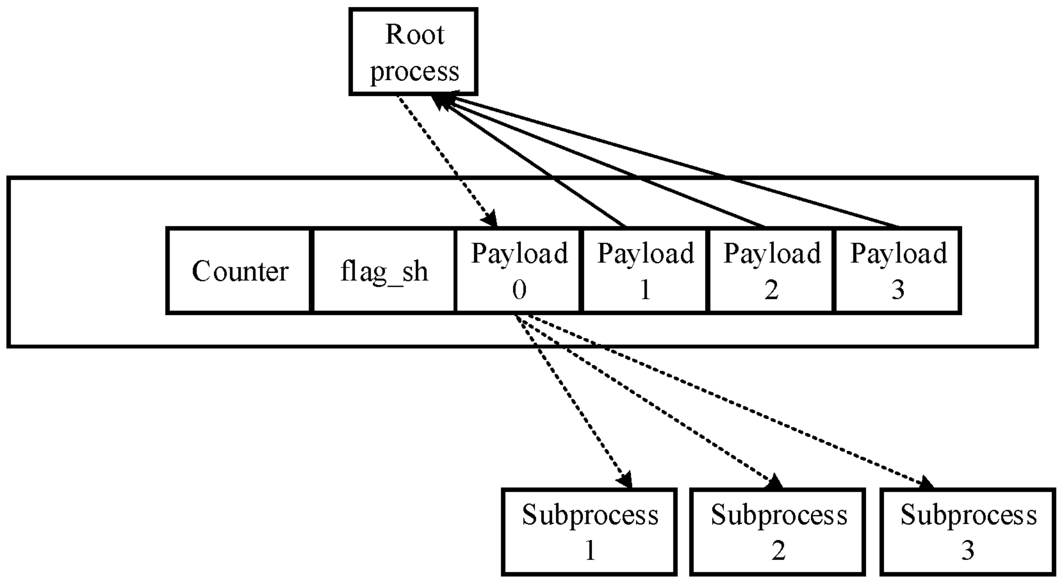
FIG. 1C is a schematic diagram of data transmission between a subprocess and a root process.

The foregoing process may be shown in an upper part of FIG. 1C. The subprocess 1, the subprocess 2, and the subprocess 3 respectively write a payload 1, a payload 2, and a payload 3 into independent buffer areas in a shared memory area, and send notification messages to the root process. One manner in which the subprocess notifies the root process is to increase a count of a flag bit Counter by 1. The root process needs to determine whether a value of the flag bit Counter is 3 (for example, the root process needs to receive the data of the three subprocesses). When the value reaches 3, it is determined that the data sent by all the subprocesses is received. The payload 1, the payload 2, and the payload 3 are obtained from the corresponding buffer areas and processed.

When the root process sends data to the subprocesses (the subprocess 1, the subprocess 2, and the subprocess 3), an implementation process is as follows:

Step B1: The root process sends, to a buffer area in a broadcast manner, data that needs to be sent.

Step B2: The root process notifies each subprocess that the data has been sent.

Step B3: Each subprocess polls whether a notification message sent by the root process is received.

Step B4: Each subprocess obtains corresponding data from corresponding address space based on the received notification message.

The foregoing process may be shown in a lower part of FIG. 1C. The root process writes, into a buffer area of the shared memory area, the data obtained after the payload 1, the payload 2, and the payload 3 are processed, and sends the notification message to each subprocess. A manner in which the root process notifies the subprocess is changing a value of a flag bit flag_sh. Each subprocess polls the value of the flag bit flag_sh, and when the flag bit flag_sh changes, separately obtains, from a payload 0, data obtained after processing performed by the root process.

In the foregoing implementation, after sending the data to the root process, the subprocess needs to send the notification message to the root process; and when sending the data to the subprocess, the root process also needs to send the notification message to the subprocess. Sending the notification message causes a delay. In other words, performing step A2 or step B2 causes a delay, thereby affecting efficiency of communication between processes. In addition, the root process needs to poll the flag bit Counter to determine whether the data of the subprocess is received, and the subprocess needs to poll the flag bit flag_sh to determine whether the message from the root process is received. Polling the flag bit causes resource consumption and deterioration of service processing performance.

An embodiment of the present disclosure provides a data sending method. Data that needs to be sent is written into a hardware queue. The data written into the hardware queue may be obtained by a related process. In this way, a problem of a delay caused when the notification message is sent after the data is sent can be avoided, and the flag bit does not need to be polled to determine whether the data is received, thereby improving service processing performance.

The following further describes in detail the method provided in the embodiments of the present disclosure with reference to specific examples.

Figure 2:
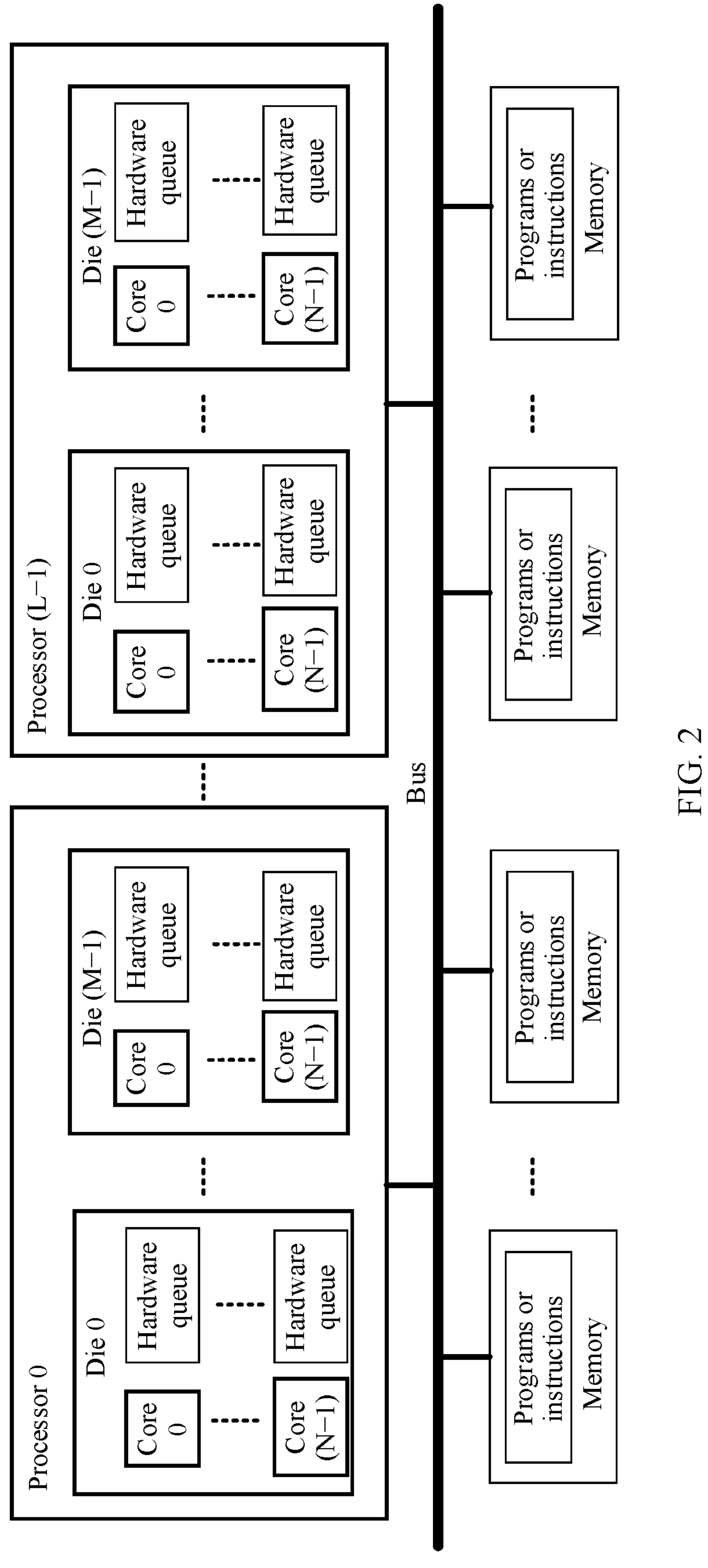
FIG. 2 is a schematic diagram of a structure of a collective communication system according to an embodiment of the present disclosure.

FIG. 2 is a schematic diagram of a structure of a collective communication system according to an embodiment of the present disclosure. As shown in FIG. 2, the collective communication system includes L processors. Each processor includes M dies. Each die includes N cores. Herein, L, M, and N are positive integers greater than or equal to 1. The L processors are separately connected to a plurality of memories by using a bus. Each memory stores a program and an instruction. The L processors or the cores in each processor implement corresponding functions through reading the program or the instruction in the memory. In an embodiment, the program stored in the memory includes an instruction of a process or an instruction of a thread in collective communication. Cores in different processors read related instructions to complete a function or an operation to be implemented by each process or each thread.

In FIG. 2, the processor and the memory are connected by using a bus. The bus may be a peripheral component interconnect (PCI) bus, a peripheral component interconnect express (PCIe) bus, an extended industry standard architecture (EISA) bus, or the like.

The memory may include a volatile memory, for example, a RAM. The memory may further include a non-volatile memory, for example, a ROM, a flash memory, a HDD, or a SSD. The RAM and the ROM are referred to as internal memories, and the HDD and the SSD are referred to as external memories.

In the collective communication system shown in FIG. 2, each core has an independent hardware queue configured to store data that needs to be sent or data that needs to be received by a communications submodule (including but not limited to a process or a thread) run by using the core.

The hardware queue in this embodiment of the present disclosure may be a hardware message queue, a lock-free hardware queue, or a lock-free hardware message queue. The following describes, by using the hardware queue, implementations of the technical solutions provided in the embodiments of the present disclosure. In specific implementation, the hardware queue may also be replaced with the hardware message queue, the lock-free hardware queue, or the lock-free hardware message queue. Lock-free in the "lock-free hardware queue or lock-free hardware message queue" indicates that order preservation of the data written into the hardware queue does not need to be implemented in a software locking manner. Software locking indicates that a plurality of pieces of data written into the hardware queue by the plurality of processes in a parallel manner are written into the hardware queue in a serial manner by using software. The data is written into the hardware queue in units of data blocks. The data block may also be referred to as a payload.

Each core may access a hardware queue corresponding to the core, or may access a hardware queue corresponding to another core. A core 0 included in a die 0 in a processor 0 is used as an example. The core 0 has an independent hardware queue, and the core 0 may directly access data in the hardware queue of the core 0. Data that needs to be sent or received by a communications submodule run by using the core 0 may be written into the hardware queue of the core 0. Optionally, another core (for example, a core 1, including but not limited to a core 1 in the same die and a core 1 in a different die) may also access the hardware queue of the core 0.

The following further describes the method provided in this embodiment of the present disclosure by using an example in which parallel computing is implemented between the core of the die 0 and the core of the die 1 in the processor 0 in FIG. 2, the root process is run by using the core 0, the subprocess 1 to the subprocess 3 are respectively run by using the core 1 to the core 3, data needs to be transmitted between the subprocess and the root process, and data is transmitted between processes by using a hardware queue.

Figure 3A:
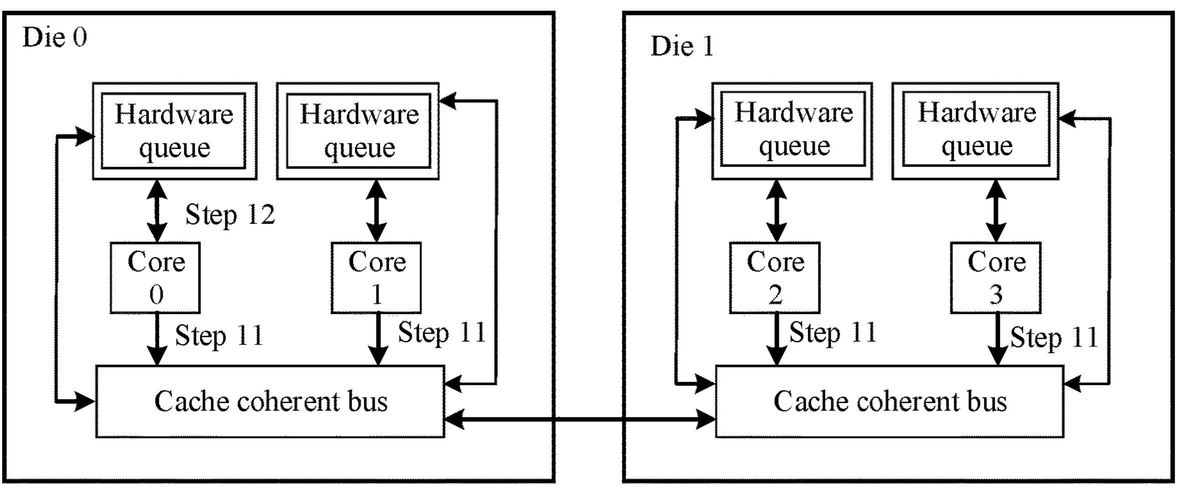
FIG. 3A is a schematic diagram of internal structures and interaction of a die 0 and a die 1 when a subprocess sends data to a root process according to an embodiment of the present disclosure.
Figure 3B:
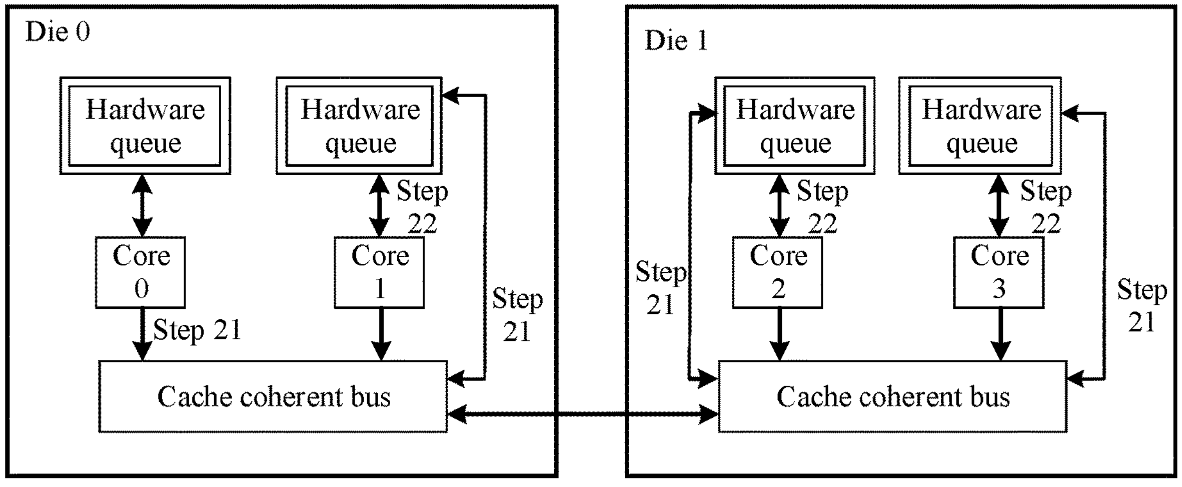
FIG. 3B is a schematic diagram of internal structures and interaction of a die 0 and a die 1 when a root process sends data to a subprocess according to an embodiment of the present disclosure.

FIG. 3A is a schematic diagram of internal structures and interaction of a die 0 and a die 1 when a subprocess sends data to a root process. FIG. 3B is a schematic diagram of internal structures and interaction of a die 0 and a die 1 when a root process sends data to a subprocess.

As shown in FIG. 3A, the die 0 includes a core 0 and a core 1. The core 0 has a hardware queue corresponding to the core 0. The core 1 also has a hardware queue corresponding to the core 1. The core 0 and the core 1 communicate with each other by using a cache coherent bus (cache coherence fabric). The cache coherent bus may be a bus for implementing communication between different processors or different dies. For example, the cache coherent bus may be an ultra-path interconnect (UPI) bus. The cache coherent bus has a function of synchronizing data changes to different cores. For example, when the core 1 modifies a piece of data, to ensure that data recorded by the core 0 can be updated in time, the cache coherent bus can send the modified data of the core 1 to the core 0, to ensure that the modification of the data can be synchronized to another core connected by using the cache coherent bus.

It should be noted that FIG. 3A shows merely some components in the die 0 and the die 1 and connection relationships between the components for ease of description. This is not used as a limitation on the die 0 and the die 1. For example, in specific implementation, each die may alternatively include a plurality of cores. Different cores in each die may have different shared caches. For example, there are 10 cores in the die 0. Four cores correspond to a shared cache 1, and the other six cores correspond to a shared cache 2. Composition of a specific structure and a connection relationship of the structure are not limited in this embodiment of the present disclosure.

The internal structures in FIG. 3B are similar to those in FIG. 3A. Details are not described again. In FIG. 3A and FIG. 3B, the subprocess 1 is run by using the core 1, the subprocess 2 is run by using the core 2, the subprocess 3 is run by using the core 3, and the root process 0 is run by using the core 0.

In the present disclosure, a plurality of subprocesses send data to the root process by using a many-to-one parallel computing process. Each subprocess writes, into a hardware queue, data that needs to be sent to the root process. As shown in FIG. 3A, an implementation process includes the following steps:

Step 11: Each subprocess writes, into the hardware queue, the data that needs to be sent to the root process.

The hardware queue may be a hardware queue of the root process, that is, a hardware queue of the core 0 for running the root process. Alternatively, the hardware queue may be a hardware queue of each subprocess, that is, a hardware queue of a core for running the subprocess. Alternatively, the hardware queue may be an independent hardware queue, and is specially configured to store data that needs to be transmitted between each of the subprocesses 1, 2, and 3 and the root process. FIG. 3A is described by using an example in which each subprocess writes the data into the hardware queue of the core 0.

In specific implementation, each subprocess writes the data into the hardware queue by using a corresponding core. In an embodiment, the subprocess 1 writes, into the hardware queue of the core 0 by using the core 1, the data that the subprocess 1 needs to send to the root process. Likewise, the subprocess 2 writes the data into the hardware queue of the core 0 by using the core 2, and the subprocess 3 writes the data into the hardware queue of the core 0 by using the core 3.

That the subprocess 1 is run by using the core 1 specifically indicates that the subprocess 1 is run on the core 1, or the core 1 runs a program or an instruction corresponding to the subprocess 1 to complete a data transmission-related function of the subprocess 1. A manner in which another process is implemented by using a core is similar to a manner in which the subprocess 1 is implemented by using the core 1. Details are not described again.

In an embodiment, the subprocess 1 writes, into the hardware queue by using a cache coherent bus in the die 0, the data that needs to be sent to the root process 0, and the subprocesses 2 and 3 write, into the hardware queue by using a cache coherent bus between the die 1 and the die 2, the data that needs to be sent to the root process.

Step 12: The root process polls a state of the hardware queue of the root process by using the core 0; when the state of the hardware queue reaches a preset condition, determines that the subprocess completes sending data; and obtains, from the hardware queue of the core 0, the data sent by each subprocess, and processes the data.

Optionally, that the root process polls the state of the hardware queue of the root process by using the core 0 may be that the root process polls, by using the core 0, whether a length of the hardware queue of the root process reaches a preset length. It is assumed that a length of a data block is 1. When the root process needs to receive the data from the three subprocesses and processes only three data blocks each time, the root process determines, by using the core 0, whether the length of the hardware queue of the root process is 3. When the length of the hardware queue is 3, it is determined that the length of the hardware queue reaches the preset condition, and the root process obtains the data from the hardware queue by using the core 0. In an implementation, the hardware queue may further include other data. That the root process polls the state of the hardware queue of the root process by using the core 0 may be that the root process determines, by using the core 0, whether the length of the hardware queue of the root process is increased by 3. When the length of the hardware queue is increased by 3, the root process determines that the state of the hardware queue reaches a preset state, obtains the data from the hardware queue of the root process by using the core 0, and processes the data.

In a process in which the plurality of subprocesses send the data to the root process shown in FIG. 3A, each subprocess only needs to send, to the hardware queue of the root process, the data to be sent to the root process, and the subprocess does not need to send a notification message to the root process. In this way, step A2 in the foregoing implementation method for sending data in a many-to-one manner is omitted. In addition, because the data is received by using a form of the hardware queue, the root process only needs to determine whether the state of the hardware queue reaches the preset state, and does not need to determine in a counting manner whether the data sent by all the subprocesses is received, to reduce resource occupation caused due to the counting. In this way, performance of communication between processes can be improved without changing communication correctness.

In another implementation of this embodiment of the present disclosure, the subprocess may further write management information of the data into the hardware queue. The management information includes but is not limited to information related to a packet header of the data or information required by a task of processing the data, for example, information such as a data volume, an address, or a data-related task identifier. The subprocess writes the management information of the data into the hardware queue, so that the root process can process, based on the management information, the data written into the hardware queue, to further improve efficiency of receiving and processing the data by the root process.

In another implementation of this embodiment of the present disclosure, the root process may obtain the data from the hardware queue without waiting the length of the hardware queue to reach 3. For example, when the length of the hardware queue is 1, the root process obtains the data from the hardware queue. When three data blocks are obtained, this time of data receiving is completed. In this way, a speed at which the root process obtains the data sent by each subprocess can be further improved, and a delay required for obtaining the data can be reduced. Further, if the root process needs to receive the data of the three subprocesses, after the root process obtains two data blocks from the hardware queue, when the root process fails to obtain a third data block from the hardware queue in a preset time, it indicates that the root process fails in receiving the data at this time. In this case, the root process discards the two data blocks that have been obtained from the hardware queue, and re-initiates a process of receiving the data sent by each subprocess or triggers error interruption or the like.

The foregoing is an implementation in which each subprocess sends, to the hardware queue of the root process, the data that needs to be sent to the root process. When each subprocess sends, to the hardware queue of each subprocess, the data that needs to be sent to the root process, that is, when the hardware queue is the hardware queue of each subprocess, the root process may poll a state of the hardware queue of each subprocess, and when the hardware queue of each subprocess changes, obtain corresponding data from the hardware queue corresponding to each subprocess. In addition, a delay of communication between processes can be reduced, and efficiency of communication between processes can be improved.

In the scenario shown in FIG. 1A, the core 0 does not share the level-3 cache with the core 2 and the core 3. Therefore, when the foregoing steps A2-A4 are performed, the core 2 sends a notification message to the core 0 or the core 3 sends a notification message to the core 0, and the core 0 polls the notification message sent by the core 2 or the core 3. Because different shared caches (level-3 caches) need to be crossed, a delay in this case is longer than a delay existing when the notification message is sent between the core 0 and the core 1 and the notification message is polled. In the scenario shown in FIG. 1B, the core 0 does not share the level-2 cache with the core 2 and the core 3, and there is also a problem that a communication delay is longer when the foregoing steps A2-A4 are performed.

In the foregoing method in this embodiment of the present disclosure, each subprocess writes, into the hardware queue, the data to be sent to the root process. When the subprocess 2 and the subprocess 3 separately communicate with the root process 0 across dies, even if the subprocess 2 and the subprocess 3 do not share a cache with the root process 0, data transmission between processes that is implemented between each of the processes 2 and 3 and the root process 0 by using the hardware queue is not affected by the shared cache. Therefore, a delay caused due to transmission of a notification message can be significantly reduced. In addition, the root process polls a change of the state of the hardware queue of the root process. In comparison with a manner in which processes across dies determine whether a notification message of a subprocess is received, a polling waiting time of the root process can be significantly reduced.

The root process receives the data sent by the subprocess, processes the data, and then sends the processed data to each subprocess. A process in which the root process sends the data to each subprocess is shown in FIG. 3B.

Step 21: The root process writes the processed data into the hardware queue.

Similar to step 11, the root process may write the processed data into the hardware queue of the root process, or may write the processed data into the hardware queue of each subprocess, or may write the processed data into a dedicated hardware queue. FIG. 3B is described by using an example in which the root process writes the processed data into the hardware queue of each subprocess.

Step 22: Each subprocess polls the hardware queue of the subprocess, and obtains data from the hardware queue when a state of the hardware queue of the subprocess reaches a preset state.

Optionally, that the state of the hardware queue reaches the preset state may be an increase in a length of the hardware queue. For example, the subprocess 2 polls a hardware queue of the subprocess 2 by using the core 2. When a length of the hardware queue of the core 2 is increased, the subprocess 2 determines that the data sent by the root process is received, and obtains the data from the hardware queue of the subprocess 2. In specific implementation, each subprocess may alternatively obtain the data from the hardware queue of the subprocess when being triggered by another condition. A specific trigger manner is not limited in this embodiment of the present disclosure.

In another implementation provided in this embodiment of the present disclosure, the root process may alternatively write the management information of the data into the hardware queue, that is, write the management information of the data into the hardware queue of each subprocess. Based on the management information in the hardware queue, efficiency of receiving the data of the root process by the subprocess can also be improved.

In a process in which the root process sends the data to a plurality of subprocesses shown in FIG. 3B, the root process only needs to write the to-be-sent data into the hardware queue corresponding to each subprocess, and the root process does not need to send a notification message to each subprocess. Each subprocess can obtain, from the hardware queue of the subprocess, the data sent by the root process. In other words, step B2 in the foregoing one-to-many data transmission method is omitted. In addition, each subprocess polls the change of the state of the hardware queue of the subprocess. In comparison with a manner in which each subprocess polls a flag bit flag-sh in the shared memory, this manner is faster. Correspondingly, a polling waiting time of the subprocess is reduced. Because no resource needs to be consumed to poll the flag bit, service processing performance is correspondingly improved.

In the scenario shown in FIG. 1A, the core 0 does not share the level-3 cache with the core 2 and the core 3. Therefore, when steps B2-B4 are performed, the core 0 sends the notification message to the core 2 or the core 0 sends the notification message to the core 3, and the core 2 or the core 3 polls the notification message sent by the core 0. Because different shared caches (level-3 caches) need to be crossed, a delay in this case is longer In the scenario shown in FIG. 1B, the core 0 does not share the level-2 cache with the core 2 and the core 3, and there is also a problem that a delay is longer when steps B2-B4 are performed.

In the foregoing method in this embodiment of the present disclosure, the root process sends the processed data to the hardware queue of each subprocess. When the subprocess 2 and the subprocess 3 separately communicate with the root process 0 across dies, data transmission between processes is not affected by the shared cache. Therefore, a delay caused due to transmission of a notification message can be reduced by using the hardware queue. In addition, the subprocess 2 and the subprocess 3 poll the changes of the states of the hardware queues of the subprocess 2 and the subprocess 3. In comparison with a manner in which processes across dies determine whether a notification message of the root process is received, a polling waiting time of the subprocess can be further reduced.

It may be understood that in the foregoing implementations shown in FIG. 3A and FIG. 3B, a plurality of data blocks may be stored in a hardware queue corresponding to each core. For example, each core may process a plurality of tasks, and data corresponding to each task needs to be stored in the hardware queue. When the data is written into the hardware queue corresponding to the subprocess or the root process, each process may determine the change of the state of the hardware queue based on an increase of the length of the hardware queue. In other words, when the length of the hardware queue of the process is increased, it is determined that new data is written into the hardware queue and the state changes. In addition, each process may obtain corresponding data from a corresponding queue in a first in first out manner, or process obtained data.

Implementations shown in FIG. 3A and FIG. 3B are manners of implementing data transmission when cores located in different dies share different caches. Parallel computing may also be implemented, in the foregoing manner of transmitting data by using a hardware queue, between processes that are separately run on different processors. Similarly, a delay can also be reduced, and communication performance can also be improved. For example, in FIG. 2, the core 0 in the processor 0 is used as the root process, the core 1 in the processor 1 runs the subprocess 1, the core 2 in the processor 2 runs the subprocess 2, and the core 3 in the processor 3 runs the subprocess 3. When many-to-one, one-to-many, or many-to-many parallel computing communication needs to be performed between these processes, reference may also be made to the implementation in FIG. 3A or FIG. 3B. In other words, communication between cores across processors is implemented in a manner of a hardware queue. Further, because communication between cores across processors or across dies needs to be transmitted by using an interconnect bus between processors or an interconnect bus between dies, a communication delay is longer. When data is transmitted by using the hardware queue, no notification message needs to be sent, thereby significantly reducing the delay. In addition, there are different shared caches between cores run in different processors or cores run in different dies. Notification messages sent between processes run by using these cores need to be transmitted by using an interconnect bus between processors or an interconnect bus between dies. In this case, a communication delay is longer. By using the hardware queue, no notification message needs to be sent between processes, thereby significantly reducing a delay caused due to transmission of a notification message. In addition, it is faster to use the hardware queue to determine whether a notification message of a process is received, to correspondingly reduce a polling waiting time of the process. In addition, because a counting manner does not need to be used to determine whether the data sent by all the subprocesses is received, performance of communication between processes can be improved without changing communication correctness.

The processes shown in FIG. 3A and FIG. 3B are implementations described by using an example in which the plurality of subprocesses communicate with the root process and the root process communicates with the plurality of subprocesses. The foregoing manner of transmitting data between processes by using the hardware queue provided in this embodiment of the present disclosure may also be applied to a scenario in which two processes communicate with each other. A quantity of processes implementing communication is not limited in this embodiment of the present disclosure. In a one-to-one, one-to-many, many-to-one, or many-to-many implementation scenario, data transmission between processes may be implemented by using the hardware queue.

It should be noted that the foregoing embodiment is described by using an example in which a CPU is used as a processor and a core in the CPU is used as a minimum unit for executing a process task. In specific implementation, this embodiment may also be implemented on a processor such as a GPU. In other words, the CPU in the foregoing embodiment may be replaced with a GPU. When data needs to be transmitted between processes or threads run by using the GPU, the data may also be transmitted in a manner of a hardware queue. In this way, objectives of improving efficiency and improving performance can also be achieved. In addition, for another processor similar to the CPU or the GPU, for example, a processor or a chip having a computing capability such as a GPGPU, a TPU, or a DPU, the implementation in the foregoing embodiment may be used to implement data transmission between different communications submodules. Details are not described again.

The following further describes, by using specific examples, the data transmission method provided in the embodiments of the present disclosure.

Generally, a plurality of processes are started to run an HPC application such as weather forecast software. When the plurality of processes need to exchange data, an MPI collective communication operation is required. The collective communication operation includes but is not limited to an operation such as MPI_Allreduce, MPI_Bcast, or MPI_Reduce.

MPI_Allreduce is used as an example. Allreduce splits collective communication into a many-to-one reduction operation (reduce) and a one-to-many broadcast operation (broadcast). A specific process of Allreduce is divided into two phases: fan-in (FANIN) and fan-out (FANOUT). FANIN indicates a many-to-one convergence phase, and FANOUT indicates a one-to-many broadcast phase. Through Allreduce, point-to-point communication exists between processes.

FIG. 1C is a schematic diagram of implementing Allreduce. As shown in FIG. 1C, a process of implementing Allreduce based on a compare and swap (CAS) atomic operation is as follows: In a fan-in phase, the root process receives the data from the subprocess, and determines whether a counter is equal to a quantity of subprocesses to determine whether data of all the subprocesses has arrived. The Counter is implemented by using a CAS atomic addition operation. In a fan-out phase, the root process transmits the reduced data to a shared memory area, and notifies, by using a flag bit flag_sh, all the subprocesses that a message has arrived. The subprocess polls the "flag_sh" flag bit to determine whether the data arrives. When the data arrives, the subprocess copies the data from the shared memory area. The reduction indicates an arithmetic operation performed on the received data, and includes but is not limited to performing summation, obtaining a maximum value, exchanging, and the like. A specific operation type is determined based on service logic.

Figure 4A:
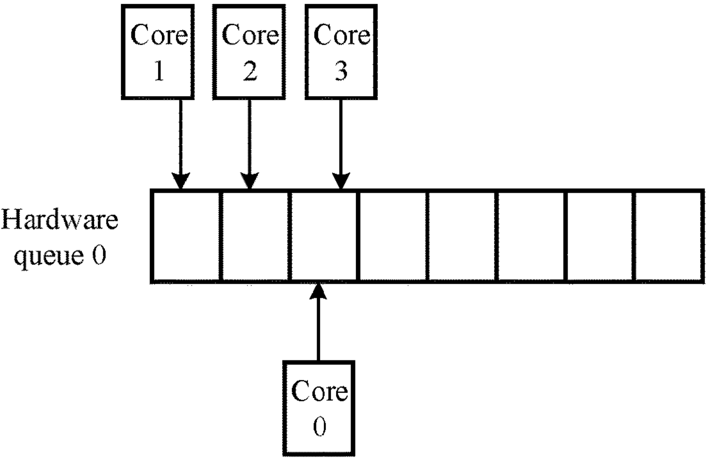
FIG. 4A is a schematic diagram of implementing many-to-one communication by using a hardware queue according to an embodiment of the present disclosure.

FIG. 4A is a schematic diagram of implementing many-to-one communication in Allreduce by using a hardware queue according to an embodiment of the present disclosure. With reference to the method shown in FIG. 3A, as shown in FIG. 4A, an implementation process of the method provided in this embodiment of the present disclosure in the FANIN phase includes the following steps:

The subprocesses 1, 2, and 3 respectively send, to the hardware queue 0 of the root process by using the cores 1, 2, and 3, the data that needs to be sent to the root process.

The root process obtains the data from the hardware queue 0 of the root process by using the core 0.

The root process performs the reduction operation by using the core 0.

In an implementation shown in FIG. 4A, the following example is used for description: The subprocess 3 first sends the data to the hardware queue 0 of the root process by using the core 3, the subprocess 2 sends the data to the hardware queue 0 of the root process by using the core 2, and finally, the subprocess 1 sends the data to the hardware queue 0 of the root process by using the core 1. The data sent by the subprocess 3 first enters the hardware queue 0, and then sequentially the data sent by the subprocess 2 and the data sent by the subprocess 1. According to a first in first out principle of the hardware queue, the root process 0 first reads, by using the core 0, the data that is sent by the subprocess 3 to the hardware queue 0, then reads the data that is sent by the subprocess 2 to the hardware queue 0, and finally reads the data that is sent by the subprocess 0 to the hardware queue 1.

In comparison with the implementation shown in FIG. 1C, many-to-one parallel computing is implemented for a plurality of subprocesses by using a hardware queue in this embodiment of the present disclosure. Each subprocess sends the data of the subprocess to the hardware queue of the root process. The root process determines, based on a state change (for example, a change of the length of the hardware queue) of the hardware queue, whether the data arrives. Each subprocess does not need to send a notification message, thereby reducing a delay of communication between the subprocess and the root process. Especially, when the root process and the subprocess are located in different dies, or the shared cache of the root process is different from the shared cache of the subprocess, because no notification message needs to be sent to the root process, a delay caused due to transmission of a notification message can be significantly reduced. In addition, the root process does not need a counter to perform counting, to determine whether a counting value reaches a quantity of all subprocesses, thereby avoiding resource occupation and time consumption caused due to the counting. In this way, communication performance is correspondingly improved.

In another possible implementation, the subprocesses 1, 2, and 3 may send the to-be-sent data to the hardware queue of each subprocess, and the root process polls the hardware queue of each subprocess and obtains the corresponding data. Alternatively, the subprocesses 1, 2, and 3 may send the to-be-sent data to an independent hardware queue, and the root process obtains the corresponding data from the independent hardware queue.

FIG. 4B is a schematic diagram of implementing one-to-many communication in Allreduce by using a hardware queue according to an embodiment of the present disclosure. With reference to the method shown in FIG. 3B, as shown in FIG. 4B, a process of implementing one-to-many communication in the method provided in this embodiment of the present disclosure in the FANOUT phase includes the following steps:

The root process sends, to the hardware queue of each subprocess by using the core 0, the data that needs to be sent to the subprocess.

The subprocesses 1, 2, and 3 respectively check the lengths of the hardware queues of the subprocesses 1, 2, and 3 by using the cores 1, 2, and 3.

The subprocesses 1, 2, and 3 respectively receive, by using the cores 1, 2, and 3, the data sent by the root process.

In an implementation shown in FIG. 4B, an example in which only the data sent by the root process is written into the hardware queue of each subprocess is used to display a process in which the root process sends the data to the hardware queue of each subprocess, and each subprocess obtains, from the hardware queue of the subprocess, the data sent by the root process. For example, the root process sends the data to the hardware queue 1 of the subprocess 1 by using the core 0. Because the hardware queue 1 includes only the data sent by the root process by using the core 0, the subprocess 1 directly obtains, from the hardware queue 1 by using the core 1, the data sent by the root process. It may be understood that, when there is other data in the hardware queue 1, the subprocess 1 obtains the data in the hardware queue 1 in a first in first out manner. In other words, the subprocess 1 may also obtain, from the hardware queue 1 in the first in first out manner, the data sent by the root process.

In comparison with the implementation shown in FIG. 1C, one-to-many parallel computing is implemented when the root process sends the data to the plurality of subprocesses by using the hardware queue in this embodiment of the present disclosure. The root process sends the data to the hardware queue of each subprocess. Each subprocess determines, based on a state change (for example, a change of the length of the hardware queue) of the hardware queue, whether the data arrives. The root process does not need to use the flag bit "flag_sh" to notify all the subprocesses that the message has arrived, to reduce a communication delay. Especially, when the root process and the subprocess are located in different dies, or the shared cache of the root process is different from the shared cache of the subprocess, because no notification message needs to be sent to the subprocess, a delay caused due to transmission of a notification message can be significantly reduced. In addition, each subprocess does not need to poll a state of the flag bit "flag_sh" to determine whether the data sent by the root process is received, thereby avoiding resource occupation and time consumption caused due to the polling of the state of the flag bit. In this way, communication performance is correspondingly improved.

In another possible implementation, the root process may write the to-be-sent data into the hardware queue of the root process by using the core 0, and the subprocesses 1, 2, and 3 poll the hardware queue of the root process respectively by using the cores 1, 2, and 3 and obtain the corresponding data. Alternatively, the root process may write the to-be-sent data into an independent hardware queue by using the core 0, and the subprocesses 1, 2, and 3 poll the independent hardware queue respectively by using the cores 1, 2, and 3 and obtain the corresponding data.

It should be noted that the foregoing is a manner of using a hardware queue to transmit data between processes. In specific implementation, data transmission between processes may also be implemented by using a register corresponding to each core. The core writes data into or reads data from the register or a hardware queue corresponding to the core. Reading efficiency and writing efficiency are the same or basically the same. Generally, storage space of the register is relatively small, and storage space of the hardware queue is relatively large. It is easier to implement the technical solutions provided in this embodiment of the present disclosure by using the hardware queue.

FIG. 5 is a schematic flowchart of a collective communication method according to an embodiment of the present disclosure. As shown in FIG. 5, the method includes the following steps:

Step 500: A second communications submodule sends, to a hardware queue, data that needs to be sent to a first communications submodule. The hardware queue is a hardware queue in a first processor for running the first communications submodule or a hardware queue in a second processor for running the second communications submodule.

Step 502: The first communications submodule obtains the data from the hardware queue when a state of writing data into the hardware queue is triggered. The second communications submodule is one of a plurality of second communications submodules. The plurality of second communications submodules communicate with the first communications submodule in a parallel manner. Alternatively, the first communications submodule is one of a plurality of first communications submodules. The plurality of first communications submodules communicate with the second communications submodule in a parallel manner.

The method shown in FIG. 5 may be implemented with reference to the implementation shown in FIG. 3A or FIG. 3B. For example, in the implementation shown in FIG. 3A, the first communications submodule may be the root process, the second communications submodule may be the subprocess, the first processor is the die 0, and the second processor is the die 1. In the implementation shown in FIG. 3B, the first communications submodule may be the subprocess, the second communications submodule may be the root process, the first processor is the die 0, and the second processor is the die 1.

In the method shown in FIG. 5, data transmission between different submodules can be implemented by using a hardware queue, to reduce a delay caused when data is sent and then a notification message is sent. Therefore, polling of the notification message can be avoided, to improve service performance. Especially, when the root process and the subprocess are located in different dies, or a shared cache of the root process is different from a shared cache of the subprocess, a delay caused due to transmission of a notification message and polling of the notification message is increased exponentially. In the method shown in FIG. 5, the delay caused due to transmission of the notification message can be significantly reduced.

Figure 6:
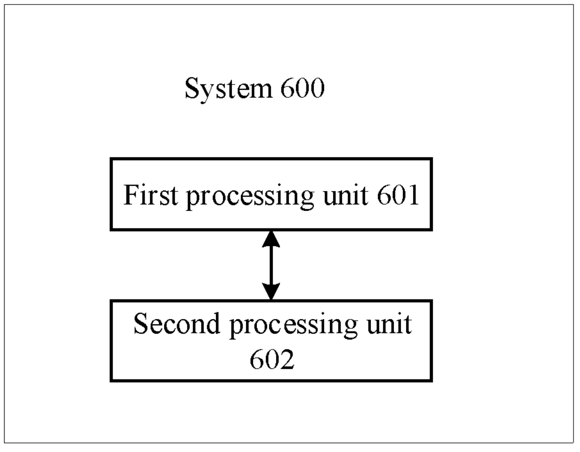
FIG. 6 is a schematic diagram of a structure of a system according to an embodiment of the present disclosure.

FIG. 6 is a schematic diagram of a structure of a system 600 according to an embodiment of the present disclosure. The system 600 includes a first processing unit 601 and a second processing unit 602.

The second processing unit 602 is configured to send, to a hardware queue, data to be sent to the first processing unit 601. The hardware queue is a hardware queue in a processor in which the first processing unit 601 is located or a hardware queue in a processor in which the second processing unit 602 is located.

The first processing unit 601 is configured to obtain the data from the hardware queue when a state of writing data into the hardware queue is triggered. The second processing unit is one of a plurality of second processing units. The plurality of second processing units communicate with the first processing unit in a parallel manner. Alternatively, the first processing unit is one of a plurality of first processing units. The plurality of first processing units communicate with the second processing unit in a parallel manner.

The system shown in FIG. 6 may be implemented with reference to the implementation shown in FIG. 3A or FIG. 3B. For example, the system shown in FIG. 3A is an implementation of the system 600. The first processing unit 601 may be the core 0 in the die 0, and the second processing unit 602 may be the core 1 in the die 0 or may be the core 2 or the core 3 in the die 1. The system shown in FIG. 3B may also be an implementation of the system 600. The first processing unit 601 may be the core 1 in the die 0 or may be the core 2 or the core 3 in the die 1, and the second processing unit 602 may be the core 0 in the die 0.

The system shown in FIG. 6 may be an implementation solution for implementing data transmission between different dies in the same processor, for example, an implementation solution for implementing data transmission between different cores in a CPU of a computer device. Alternatively, the system may be an implementation solution when data transmission is implemented between different processors, for example, an implementation solution when data is transmitted between different CPUs in a computer device. Alternatively, the system may be another implementation solution for implementing data transmission between cores located in different computer devices.

In the system shown in FIG. 6, data transmission is implemented by using a hardware queue, to reduce a delay caused when data is sent and then a notification message is sent. Therefore, transmission of the notification message and polling of the notification message can be avoided, to improve service performance. Especially, when the root process and the subprocess are located in different dies, or the shared cache of the root process is different from the shared cache of the subprocess, a delay caused due to transmission of the notification message can be significantly reduced by using the system shown in FIG. 6.

A person of ordinary skill in the art may be aware that, in combination with the examples described in the embodiments disclosed in this specification, units and steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

In the several embodiments provided in the present disclosure, it should be understood that the disclosed system and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present application.

In addition, function units in the embodiments of the present application may be integrated into one processing unit, or each of the units may exist alone physically, or two or more units are integrated into one unit. The integrated unit may be implemented in a form of hardware, or may be implemented in a form of a software function unit.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method implemented by a system, the data transmission method comprising:

sending, by a second communications submodule to a hardware queue, data for a first communications submodule, wherein the hardware queue is either in a first processor for running the first communications submodule or a second processor for running the second communications submodule;

polling, by the first communications submodule, a state of writing data into the hardware queue;

identifying, by the first communications submodule, that the second communications submodule completes sending the data for the first communications submodule when the state of writing the data into the hardware queue reaches a preset condition, wherein the preset condition comprises a length of the hardware queue reaching a preset length, and wherein the preset length is based on a number of subprocesses sending data to the first communications submodule; and obtaining, by the first communications submodule and in response to identifying that the second communications submodule completes sending the data for the first communications submodule, the data from the hardware queue.

2. The data transmission method of claim 1, further comprising:

running the first communications submodule using the first processor or a first subunit in the first processor; and running the second communications submodule using the second processor or a second subunit in the second processor.

3. The data transmission method of claim 2, wherein the first processor is any one of a first central processing unit (CPU) or a (CPU), a first die in the CPU, wherein the second processor is any one of a second CPU or a second die in the second CPU, wherein the first subunit or the second subunit is a core, and wherein one die comprises one or more cores.

4. The data transmission method of claim 2, further comprising:

running the first communications submodule using a first shared cache of the first subunit; and running the second communications submodule using a second shared cache of the second subunit, wherein the first shared cache is different from the second shared cache.

5. The data transmission method of claim 1, further comprising:

reading, using the first processor, a first instruction of the first communications submodule from a memory;

executing, using the first processor, the first instruction to run the first communications submodule;

reading, using the second processor, a second instruction of the second communications submodule from the memory; and executing, using the second processor, the second instruction to run the second communications submodule.

6. The data transmission method of claim 1, further comprising:

sending, by the second communications submodule to the hardware queue, management information related to the data, and obtaining, by the first communications submodule from the hardware queue, the management information in response to triggering the state of writing data into the hardware queue.

7. The data transmission method of claim 1, further comprising running the first communications submodule and the second communications submodule in different processors.

8. The data transmission method of claim 1, wherein the preset condition is when the data in the hardware queue comprises all data to be received by the first communications submodule.

9. The data transmission method of claim 1, further comprising communicating between the first communications submodule and the second communications submodule using a message passing interface (MPI) standard interface.

10. A data transmission system comprising:

a first processing unit configured to:

poll a state of writing data into a hardware queue;

identify that a second processing unit completes sending data for the first processing unit when the state of writing the data into the hardware queue reaches a preset condition, wherein the preset condition comprises a length of the hardware queue reaching a preset length, and wherein the preset length is based on a number of subprocesses sending data to a first communications submodule; and obtain, in response to identifying that the second processing unit completes sending the data for the first processing unit, the data from the hardware queue; and the second processing unit configured to send, to the hardware queue, the data for the first processing unit, wherein the hardware queue is in a first processor for running the first communications submodule in which the first processing unit is located or in a second processor for running a second communications submodule in which the second processing unit is located, and wherein the second processing unit is one of a plurality of second processing units, and the plurality of second processing units are configured to communicate in parallel with the first processing unit, or wherein the first processing unit is one of a plurality of first processing units, and the plurality of first processing units are configured to communicate in parallel with the second processing unit.

11. The data transmission system of claim 10, wherein the first processing unit is any one of a first graphics processing unit (GPU), a first die in the first GPU, or a first core in the first die, and wherein the second processing unit is any one of a second GPU, a second die in the second GPU, or a second core in the second die.

12. The data transmission system of claim 10, wherein the first processing unit obtains the data from the hardware queue using the first communications submodule, and wherein the second processing unit sends, to the hardware queue using the second communications submodule, the data.

13. The data transmission system of claim 12, further comprising a memory configured to store the first communications submodule and the second communications submodule, wherein the first processing unit is configured to read a first instruction of the first communications submodule from the memory using a bus and execute the first instruction to run the first communications submodule, and wherein the second processing unit is configured to read a second instruction of the second communications submodule from the memory using the bus and execute the second instruction to run the second communications submodule.

14. The data transmission system of claim 12, wherein the first communications submodule is configured to communicate with the second communications submodule using a message passing interface (MPI) standard interface.

15. The data transmission system of claim 10 wherein the second processing unit is further configured to send, to the hardware queue, management information related to the data, and wherein the first processing unit is further configured to further obtain the management information from the hardware queue when the state of writing data into the hardware queue is triggered.

16. The data transmission system of claim 10, wherein the first processing unit and the second processing unit are different dies.

17. The data transmission system of claim 10, wherein a first shared cache of the first processing unit is different from a second shared cache of the second processing unit.

18. The data transmission system of claim 10, wherein the preset condition is when the data in the hardware queue comprises any data to be received by the first communications submodule.

* * * * *